United States Patent Office 3,161,789
Patented Dec. 15, 1964

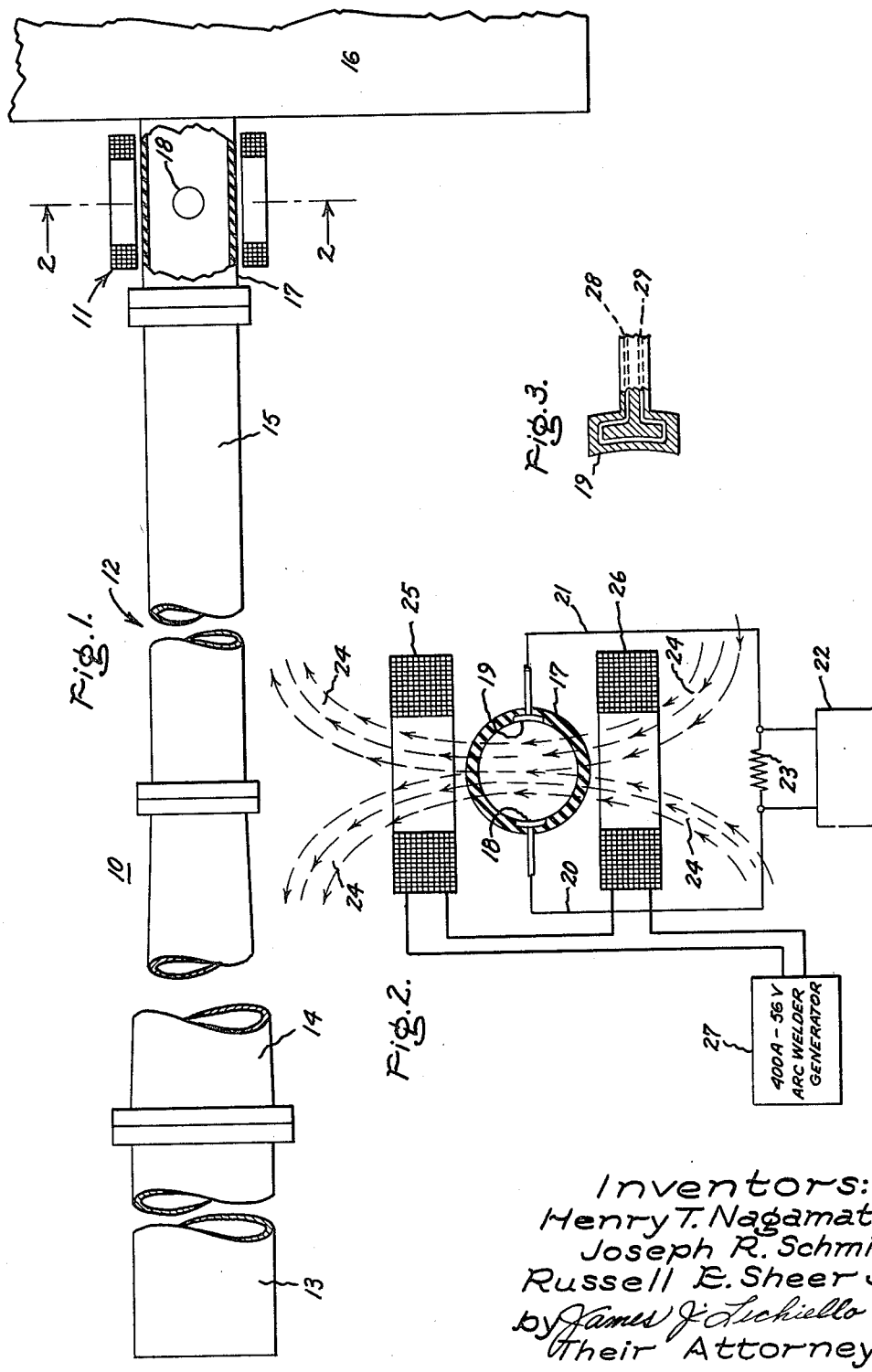

3,161,789
MHD POWER GENERATION
Henry T. Nagamatsu and Joseph R. Schmid, Schenectady, and Russell E. Sheer, Jr., Cohoes, N.Y., assignors to General Electric Company, a corporation of New York
Filed Jan. 23, 1961, Ser. No. 84,178
4 Claims. (Cl. 310—11)

This invention relates to MHD power generation and more particularly to a cold cathode and a method of operating an MHD device with a cold cathode for substantial power output.

Considerable effort has been expended towards increasing the general efficiency of the standard variety of electrical power generating equipment, such as the steam turbine generator apparatus. Because of various difficulties and problems associated therewith, it has been proposed to generate electricity by extracting energy from a moving electrically conducting fluid, preferably a gaseous one, as it passes through a magnetic field. By using a fluid conductor instead of a solid conductor, the fluid may be driven through a magnetic field without employing rotating or moving mechanical parts since a pressure differential is sufficient to cause fluid flow. The steam turbine generator apparatus with its associated mechanical problems would, therefore, no longer be necessary. The body of scientific knowledge relating to the interaction of a conducting gaseous fluid with a magnetic field is more commonly known as magnetohydrodynamics (generally abbreviated as MHD). The references in this specification to the generation of electrical power by the interaction of a conducting fluid in a magnetic field will be to magnetohydrodynamic power generation or MHD.

A typical example of an MHD power generating system in the prior art is disclosed in U.S. Patent 1,717,413 issued June 18, 1929 to R. Rudenberg. This patent disclosure describes utilizing a gas stream as a conducting medium by raising the temperature thereof to the point where it becomes partially ionized. The degree of ionization is then substantially increased by exposure to an electric arc. Thereafter, the ionized gas stream is caused to flow by means of a pressure differential through a narrow throat wherein a magnetic field is applied. The passage of the charged particles through the magnetic field causes an electromotive force (E.M.F.) to be generated in the gas. Under the influence of this E.M.F. generated at the expense of the kinetic energy of the ionized gas stream such charged particles as are present in the ionized gas are deflected to a pair of electrodes causing a unidirectional current to flow through an external load circuit connected to the electrodes, if the impedance of the external circuit is low enough for the induced E.M.F. to force a current therethrough.

Overcoming circuit impedance is generally aided by providing a supply of input electrons to the system via one of the electrodes. This poses a serious problem when working with a plasma, since it is characteristic of plasmas to try to remain as neutral electrically as possible, that is, the sum of the positive charges is equal to the sum of the negative charges. Therefore, in order for electrons to leave and pass through the external circuit there must be an input of electrons to the system to replace the electrons removed and this supply of input electrons must be provided to the plasma from some outside source. A convenient source is the surface of one of the electrodes and separation of electrons from the surface of a metallic electrode has been the mechanism commonly employed. However, the energy required for such electron release has in the past always been supplied by heating of the electrode to a high temperature. This capacity for high temperature heat exposure therefore dictates that such an electrode must be made of materials resistant to high temperatures, as for example tungsten, in order to stand the constant internal heating to the "boiling off" temperature for the electrons.

Difficult maintenance problems are characteristic of these prior art MHD systems because of the environmental conditions to which the internal current collecting electrodes are exposed. These electrodes are usually in direct contact with the conducting gaseous medium and are therefore exposed to ambient temperatures of several thousand degrees Fahrenheit. Cooling of the electrodes in earlier modes of operation below the temperature at which electrons will be liberated therefrom has been impossible because without this input of electrons useful quantities of current could not be made to flow in the external circuit. Because of this limitation in the degree to which the electrodes can be cooled, they rapidly erode and must be frequently replaced. The general effect of necessarily and frequently replacing electrodes prevents such a device from having a high efficiency or dependable long life.

Accordingly, it is an object of this invention to increase the efficiency of an MHD power generating device.

It is a further object of this invention to increase the life of the current collecting electrodes in an MHD device.

It is another object of this invention to operate an MHD device with a high power output with cold cathodes.

Briefly described, this invention includes in an MHD device, wherein input electrons are supplied from electrode means which are exposed to the very high temperature and velocity of a plasma medium, operation of the MHD device with the electrode means maintained at a temperature substantially below the temperature at which substantial electron emissivity from at least one electrode occurs while, at the same time, providing a high power output.

This invention will be better understood when taken in connection with the following description and drawings in which:

FIG. 1 is a schematic representation of a shock tunnel method of providing a high temperature high velocity ionized gas stream for power generation;

FIG. 2 is a schematic representation of one form of MHD device utilized in conjunction with the shock tunnel of FIG. 1; and FIG. 3 is a cross section of a typical cooled electrode.

It has been accepted knowledge in the electrical arts generally, power tubes, for example, that a cathode must be heated to that degree where substantial electron emissivity occurs, in order to function properly as a source of electrons. The particular temperature necessary depends on the kind of metal employed and may range, for example, from about 600° C. to 1200° C. and greater.

For an ordinary clean copper cathode, this temperature is about 1100° C. Various handbook tabulations are available in the art for the emissivity temperatures or curves for the more common metals. On the other hand, in an MHD device as described, the cathodes may be exposed to a plasma, a gas having a temperature on the order of 10,500° C. and moving at a velocity of about Mach 30. The operating life of a cathode exposed to these extreme conditions has heretofore been very short and has required that the machine be shut down frequently for replacement of the cathodes. It is obvious that this condition is a disadvantage deterring the use of an MHD device for power generation. Of course, these cathodes may be, and usually are, cooled by suitable and well known fluid cooling means. However, as mentioned above, the degree of cooling has been limited to the extent that the temperature of the electrodes remains above that temperature at which electron emissivity is obtained from the electrode to a substantial degree. The operating temperature will depend on the metal employed, for example for copper the temperature required would be at least about 1000° C. Even at this temperature, in the environmental conditions as described, the cathode is operative for only a short period of time. Thus, although the cathode may be cooled from some very high temperature, for example higher than 10,500° C., to the temperature at which emissivity occurs to a substantial degree, operation at a still lower temperature with ordinary metal electrodes instead of high temperature metals, such as tungsten, was hitherto believed impossible.

It has been discovered that an MHD electrical power generating device may be operated effectively with a cathode at room temperature, for example, for electrical power generation. This behavior can only be explained by the liberation of the necessary input electrons from the electrode surface by some unexpected mechanism. In fact, it has been discovered that operation with room temperature or cold cathode will provide power output equivalent to operation with a hot cathode. Generally speaking, power generation may now be accomplished with cathode temperatures from room temperature up to those temperatures considered necessary for proper electron emissivity. This discovery has enabled the use of common metals, as for example copper, for electrode construction and, as well, brought about a great increase in electrode life. Operation of an MHD device with a cold cathode is best described in relation to FIG. 1.

Referring now to FIG. 1, there is illustrated an apparatus 10 which comprises in general an MHD power generator 11 and a shock tunnel 12. Tunnel 12 provides a supply of high temperature ionized gas, or plasma, to flow through the generator 11 as an electrically conducting medium. It is, of course, understood that any apparatus or method may be employed in lieu of the shock tunnel 12 to provide a high temperature ionized conducting medium. In this respect, shock tunnels are also well known in the art so that a detailed description is unnecessary. In the practice of this invention, in one form, shock tunnel 12 includes a driver section 13, a diaphragm section 14, a shock tube section 15 and a dump tank 16.

Driver section 13 is a 20-foot long steel tube of 6-inch inside diameter and 4-inch wall thickness. Fuel and oxidant from a supply not shown are admitted for combustion in the driver section. One fuel combination is a stoichiometric mixture of hydrogen and oxygen with helium as a diluent.

Between the driver section 13 and shock tube section 15 is a diaphragm section 14 which is a steel conical transition tube of 4-foot length. The entrance flange portion of the transition piece and exit flange of the driver section are suitably modified to contain a metal diaphragm (not shown) therebetween. This metal diaphragm is scored so that rupture occurs upon proper pressure rise in the driver section.

The driven section 15 is a stainless steel tube of 4 inches inside diameter and about 100 feet in length and connects to generator 11 and a dump tank 16 (200 cu. ft.) which, during operation, is evacuated.

In the driver end of the shock tunnel, a mixture of hydrogen and oxygen, diluted with varying amounts of helium, is ignited, producing a controlled explosion. This "explosion" ruptures a stainless steel diaphragm separating the burning mixture and the driver section from low pressure air in the rest of the 100-foot long tube. The shock waves thus produced, travel down the tube at extremely high velocities, compressing and heating the air just behind the shock to high temperatures. Shock velocity has been obtained as high as 32 times the speed of sound. Such a shock accelerates the air in the tube to a velocity of about 22,000 miles per hour and heats it to 10,500° C., nearly twice the temperature of the sun's surface. At such high temperatures, air is no longer the relatively simple gas of ordinary experience, but becomes a plasma—a mixture of gas atoms, ions and electrons. This plasma, unlike air, is a good conductor of electricity. This high temperature ionized gas is employed as a fluid conductor in the MHD generator 11. It is to be understood that conductivity of the gas may be increased by seeding with such metals as cesium, potassium, etc. Such seeding is not required, if the temperature employed is very high as in the practice of this invention. Generator 11 is best described in relation to FIG. 2.

Referring now to FIG. 2, the tube or channel defining member 17 of generator 11 is of an electrically insulating material. In cross section tube 17 includes a pair of electrodes 18 and 19 which, in one example, were copper discs of ½-inch diameter. Electrodes 18 and 19 are connected by leads 20 and 21, respectively, to an oscilloscope 22. Between leads 20 and 21 a variable resistance 23 is connected.

In order to generate a magnetic field whose lines of force 24 pass through tube section 17 normal to the direction of flow of hot gases therethrough, a pair of electrical field coils 25 and 26 are employed. These coils are mounted normal to the axis of the tube portion 17. Each coil has an inside diameter of 5 inches and outside diameter of 9.5 inches. They are wound from copper strips with a thickness of .010 inch and a width of 3.5 inches. 170 turns of this copper strip were used for each coil. In order to energize these coils, they are electrically connected in series relationship to a welding generator 27 of a capacity of approximately 400 amperes and 56 volts. With a current of 385 amperes through the field coils, the average magnetic field strength across the tube, where the electrodes are located, is about 2300 gauss. When the hot, ionized gas produced by the shock wave passes through this magnetic field, electrons are accelerated toward one electrode and positive ions toward the other. The result is an appreciable voltage between the electrodes, which can produce a substantial current in an external circuit. From the voltage across the external resistance, the current being extracted from the high velocity plasma is determined. The range of external resistance used in the practice of the present invention was from 0.2 to $10^6$ ohms. Heretofore, it was believed that the operation of such an MHD device required that the electrodes, or more particularly that electrode acting as a cathode in a D.-C. circuit, for example, should be heated. For clean copper surfaces at room temperature, the electron emission from a cold copper cathode is negligible. In contradistinction, it has been discovered in this invention that a hot gas plasma produced by a Mach 30 shock wave, for example, moving through a magnetic field of 2300 gauss produces a current of 115 amperes with ½-inch diameter electrodes.

By the use of the aforementioned shock tunnel technique, a shock Mach number in air was varied from 10 to 32 with the corresponding plasma equilibrium temperature range from 3600 to 11,000° K. The high velocity air plasma moving through the magnetic field induced an electromotive force across the shock tube. For the plasma produced by a Mach 30 shock wave, the voltage across the electrodes with different external loads decreased linearly with increasing current flow to the circuit. This result is in agreement with other magnetohydrodynamic investigations conducted with seeded gases at much lower velocities and temperatures. The plasma appears to behave similarly to a generator or a battery with a constant internal resistance. With a transverse magnetic field strength of 2300 gauss and a shock Mach number of 30, the current from the plasma varied from nearly 0 to 115 amperes, when using two ½-inch diameter copper electrodes diametrically opposed in the tube portion 17. This high current flow was possible with the electrodes at approximately room temperature. For a plasma produced by Mach 30 shock wave and a magnetic wave of 2300 gauss, a maximum power of 7.8 kilowatts was extracted from the plasma with the external load resistance equal to the plasma resistance of 1.85 ohms.

In another example of this invention, the air pressure in the 100-foot long shock tube was maintained at about 50 microns of mercury. With a shock Mach number of about 30, i.e., 33,000 feet per second, the air was heated to an equilibrium temperature of about 10,000° K. With a magnetic field strength across the tube 17 of 2300 gauss, the observed open circuit voltage across the electrodes was 240 volts. The time required to establish the voltage across the tube with an external resistance of 4 ohms was about 1 microsecond. A maximum current of 108 amperes was obtained with an external resistance of ⅓ ohm. This corresponds to a current density of 548 amperes per square inch for the ½-inch diameter copper electrodes at approximately room temperature.

Since the time of power output from the shock tunnel operation as described was from about 5 microseconds to 1 millisecond duration, the copper electrodes were not increased in temperature to any substantial degree. Accordingly, such a shock tunnel method may be operated successively or repetitively so that no appreciable temperature rise of the electrodes is encountered. Alternatively, where a continuous operation or steady state hot gas flow operation is employed, some means must be available to cool the electrodes to prevent a high degree of erosion. Heretofore, these cathodes were subjected to various cooling arrangements for the primary purpose of increasing their life by minimizing erosion under the extreme high temperature high velocity gas conditions. Previously, however, the degree of such cooling was limited to or by emissivity temperatures as a lower limit. By this invention, however, a comparatively high output of power may be provided from electrodes which are maintained at far lower temperatures than those ordinarily used in MHD power equipment. By cooling the cathodes to a very low temperature, their life is greatly extended and common conducting materials may be employed for their construction. Cooling of the electrode may take any of those forms well known in the art. For example, copper cathode 19 may be hollow, such as illustrated in FIG. 3, where passages 28 and 29 are provided in the cathode so that a suitable cooling fluid may be circulated therethrough. Additionally, such cathodes may be surrounded by cooling coils to reduce the temperature thereof. It suffices that the temperature of the cathodes be maintained below that where substantial emissivity takes place. A proposed general range would be from room temperatures to about 300° C.

It is, of course, understood that for D.-C. power output only, only the cathode need be cooled or maintained at low temperatures. However, for A.-C. power output both electrodes may be cooled. As a practical matter, best results are obtained when both electrodes are cooled because this means longer life and less need for frequent shutdown. Such an MHD power generator may also be employed to produce A.-C. power where both electrodes may act as cathodes. Any reasonably good conductor of electricity may be employed as the electrodes such as for example copper, tungsten, graphite but the more common materials are preferred to reduce the cost of construction. Because of this invention many additional metals and materials may be employed where formerly temperature conditions were critical. Considering cold cathode operation, it becomes a simple matter to control the temperature rise of such a cathode by its temperature, i.e., more or less cooling depending on temperature rise.

One interesting application of this method of operating an MHD device relates to space vehicles which re-enter the earth's atmosphere. Under these conditions, various signalling devices or electrical apparatuses may require a large amount of electrical power of short duration. The MHD power generator of this invention may thus be employed to provide this power without the necessity of heating the cathode. These conditions, of course, may also be true in rocket exhausts of short-time operation so that electrical power may be generated thereby without preheating cathodes.

Accordingly, the objects of this invention are attained by deliberately operating an MHD device with cold cathodes since it has been discovered that power may be generated from such an apparatus with a cold cathode. Cathode temperature may be defined as generally below that where substantial electron emissivity takes place. Therefore, it is obvious that a cold cathode may operate in the extreme conditions as described for MHD power generating devices for far longer periods of time than a hot cathode.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. In an MHD electrical power generating device wherein a hot ionized plasma passes through a magnetic field between a pair of electrodes located substantially in alignment with the magnetic field and at right angles to the direction thereof so that electric power may be withdrawn from said electrodes by introducing electrons from an outside source into the plasma, the improvement which comprises the steps of:
   (a) passing the hot ionized plasma through the magnetic field at a velocity of at least about 10 times the speed of sound and,
   (b) maintaining the temperature of said electrodes below the emissivity temperature thereof.

2. The invention as recited in claim 1 wherein the temperature in at least one of the electrodes is maintained below about 300° C.

3. In an MHD electrical power generating device where a hot ionized plasma passes through a magnetic field and between a pair of electrodes to provide electrical power to be taken from said electrodes, a method of operation therefor which comprises, passing said hot ionized plasma through said MHD device in the range of about 10 to 32 times the speed of sound, maintaining the temperature of the plasma in the range of about 3600° to 11,000° Kelvin, utilizing a magnetic field strength of at least about 2300 gauss, and maintaining the temperature of said electrodes below its emissivity temperature whereby effective electrical power may be withdrawn from the system via said electrodes.

4. In an MHD electrical power generating device where a hot ionized plasma passes through a magnetic field and between a pair of copper electrodes so that power is derived from said electrodes, the method of operation therefor which comprises, passing said hot ionized plasma through said MHD device at about 30 times the speed of sound, maintaining the temperature thereof of about 11,000° Kelvin, utilizing a field strength of at least about 2300 gauss and maintaining the temperature of said electrodes below about 1100° C., whereby an effective power output is obtained from said electrode of at least about 7.5 kilowatts.

References Cited by the Examiner

UNITED STATES PATENTS

| | | | |
|---|---|---|---|
| 957,242 | 5/10 | Noeggerath | 310—11 |
| 1,717,413 | 6/29 | Rudenberg. | |
| 2,960,614 | 11/60 | Mallinckrodt. | |
| 3,099,131 | 7/63 | Rosa | 310—11 X |

FOREIGN PATENTS 841,613   6/52   Germany.

OTHER REFERENCES

Journal of Applied Physics, vol. 28, July 1957, pages 754 to 759.

MILTON O. HIRSHFIELD, *Primary Examiner.*

DAVID X. SLINEY, *Examiner.*